(12) United States Patent
Guo et al.

(10) Patent No.: US 10,432,075 B2
(45) Date of Patent: Oct. 1, 2019

(54) LINEAR MOTOR

(71) Applicants: Shun Guo, Shenzhen (CN); Lubin Mao, Shenzhen (CN)

(72) Inventors: Shun Guo, Shenzhen (CN); Lubin Mao, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 195 days.

(21) Appl. No.: 15/412,340

(22) Filed: Jan. 23, 2017

(65) Prior Publication Data

US 2018/0026508 A1 Jan. 25, 2018

(30) Foreign Application Priority Data

Jul. 21, 2016 (CN) .......................... 2016 1 0581158

(51) Int. Cl.
*H02K 33/18* (2006.01)
*H02K 1/34* (2006.01)
*H02K 1/17* (2006.01)

(52) U.S. Cl.
CPC .............. *H02K 33/18* (2013.01); *H02K 1/17* (2013.01); *H02K 1/34* (2013.01)

(58) Field of Classification Search
CPC .......... H02K 33/18; H02K 1/34; H02K 35/04; B06B 1/04; B06B 1/045; H04R 9/00; H04R 9/02

(Continued)

(56) References Cited

U.S. PATENT DOCUMENTS

| 6,735,322 B1 * | 5/2004 | Watanabe | H04R 9/041 |
| | | | 381/401 |
| 2008/0216578 A1 * | 9/2008 | Takashima | B06B 1/045 |
| | | | 73/658 |

(Continued)

FOREIGN PATENT DOCUMENTS

| JP | 2008148218 A | * | 6/2008 |
| KR | 20140128525 A | * | 11/2014 |
| KR | 101506216 B1 | * | 3/2015 |

OTHER PUBLICATIONS

Lee, machine translation of kr101506216, Mar. 2015 (Year: 2015).*

(Continued)

*Primary Examiner* — Quyen P Leung
*Assistant Examiner* — Eric Johnson
(74) *Attorney, Agent, or Firm* — IPro, PLLC; Na Xu

(57) ABSTRACT

A linear motor includes a housing with an accommodation space; a magnet assembly accommodated in the accommodation space, the magnet assembly including a main magnet unit and two auxiliary magnet units located on both sides of the main magnet unit for forming a magnetic gap; a vibration member accommodated in the accommodation space, the vibration member including a coil inserted into the magnetic gap and weights located at both sides of the coil; and a support member suspending the vibration member in the accommodation space, the support member including an elastic supporting member supporting the vibration member and a coil frame inserted into the magnetic gap. The coil frame is disposed between the coil and the auxiliary magnet units, and the coil is wound around a side surface of the coil frame opposite to the main magnet unit.

9 Claims, 9 Drawing Sheets

(58) Field of Classification Search
USPC .............. 310/12.16, 15, 17, 21, 25, 28, 29; 381/396, 412, 420, 421
See application file for complete search history.

(56) References Cited

U.S. PATENT DOCUMENTS

| | | | |
|---|---|---|---|
| 2008/0272659 A1* | 11/2008 | Jeong | H01H 33/38 310/28 |
| 2010/0096936 A1* | 4/2010 | Bae | H02K 33/16 310/25 |
| 2013/0099603 A1* | 4/2013 | Lee | B06B 1/045 310/25 |
| 2013/0182885 A1* | 7/2013 | Fujitani | H04R 3/00 381/412 |
| 2015/0194870 A1* | 7/2015 | Kim | H02K 33/18 310/25 |
| 2016/0212547 A1* | 7/2016 | Kang | B06B 1/045 |
| 2017/0288521 A1* | 10/2017 | Jin | H02K 33/02 |
| 2018/0115229 A1* | 4/2018 | Guo | H02K 5/04 |

OTHER PUBLICATIONS

Park, Machine Translation of KR20140128525, Nov. 2014 (Year: 2014).*

Watanabe, Machine Translation of JP2008148218, Jun. 2008 (Year: 2008).*

* cited by examiner

LINEAR MOTOR

FIELD OF THE INVENTION

The invention is related to the technology of vibration motors, especially a linear motor applicable for portable consumer electronic products.

DESCRIPTION OF RELATED ART

With development of electronic technology, portable consumer electronic products are increasingly advocated, such as mobile phone, handheld game console, navigation device or multimedia entertainment handset, such electronic products generally use linear motor for system feedback, such as call alert, message alert, navigation alert, vibration feedback of game console.

The existing linear motor using coil and weight as vibrator connects the coil and the weight only by providing an elastic supporting member, and suspend the coil and the weight by the elastic supporting member, such coil lacks rigidity, and susceptible to deformation in vibration.

Therefore, it is necessary to provide an improved linear motor to overcome above disadvantage.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of present disclosure more apparent, the present disclosure is described in further detail together with the figures and the embodiments. It should be understood the specific embodiments described hereby is only to explain this disclosure, not intended to limit this disclosure.

The First Exemplary Embodiment

Figure 1:
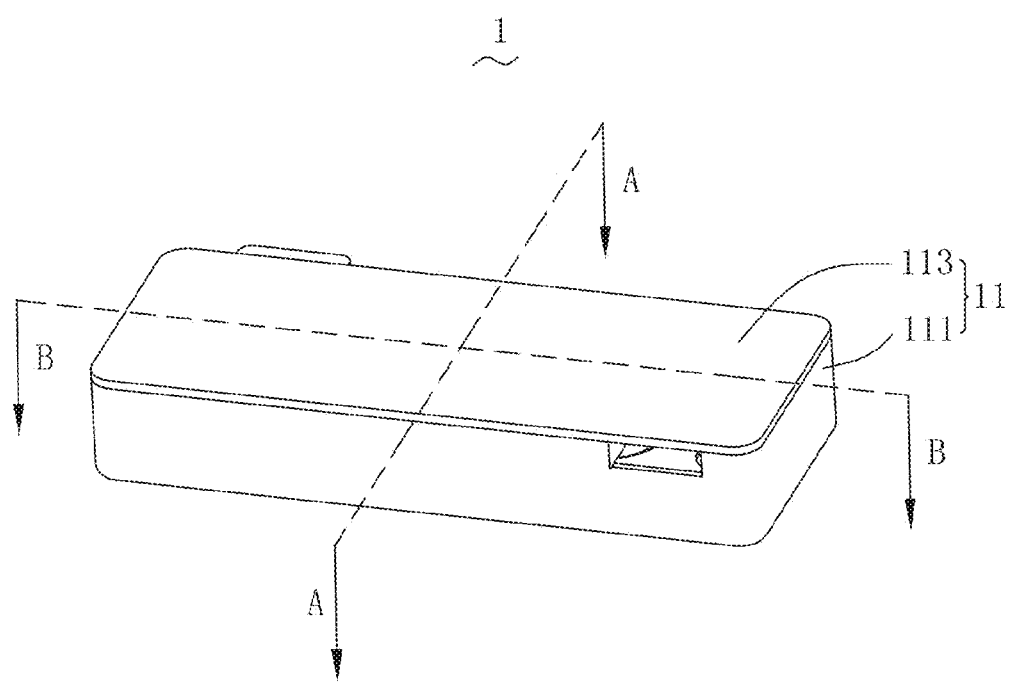
FIG. 1 is an isometric view of a linear motor in accordance with a first exemplary embodiment of the present disclosure.
Figure 2:
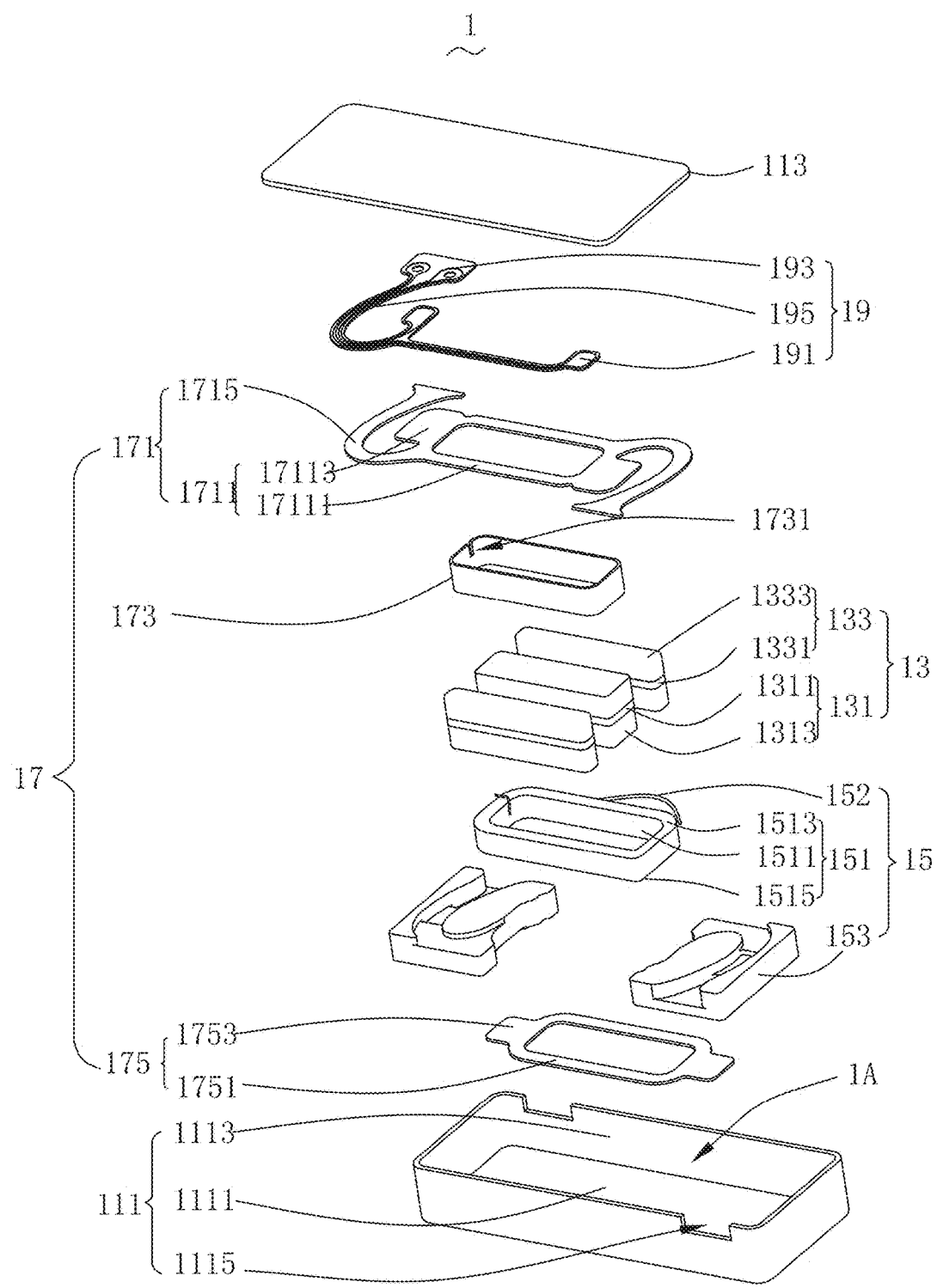
FIG. 2 is an exploded view of the linear motor in FIG. 1.

As shown in FIGS. 1-2, a linear motor 1 comprises a housing 11 with an accommodation space 1A, a magnet assembly 13 and vibration member 15 accommodated in the accommodation space 1A, a support member 17 supporting the vibration member 15 suspended in the accommodation space 1A, and a flexible circuit board 19 attached to the support member 17 and far away from the surface of the vibration member 15. The magnet assembly 13 is fixed inside the housing 11.

The housing 11 comprises a housing body 111 and a cover plate 113 cover-connected to the housing body 111. The housing body 111 and the cover plate 113 form the accommodation space 1A. The housing body 111 comprises a bottom wall 1111 provided opposite to the cover plate 113, a side wall 1113 extending in the direction from the bottom wall 1111 to the cover plate 113, and an installation slot 1115 opened on the side wall 1113. The flexible circuit board 19 is provided through the installation slot 1115. The end of the elastic supporting member 171 is installed inside the installation slot 1115 and further fixed and connected to the side wall 1113. In this embodiment, the housing 11 is in a rectangular shape, the installation slots 1115 are two in number, respectively provided on the side wall 1113 along the length direction and symmetrical about the central axis of the vibration member 15.

Figure 3:
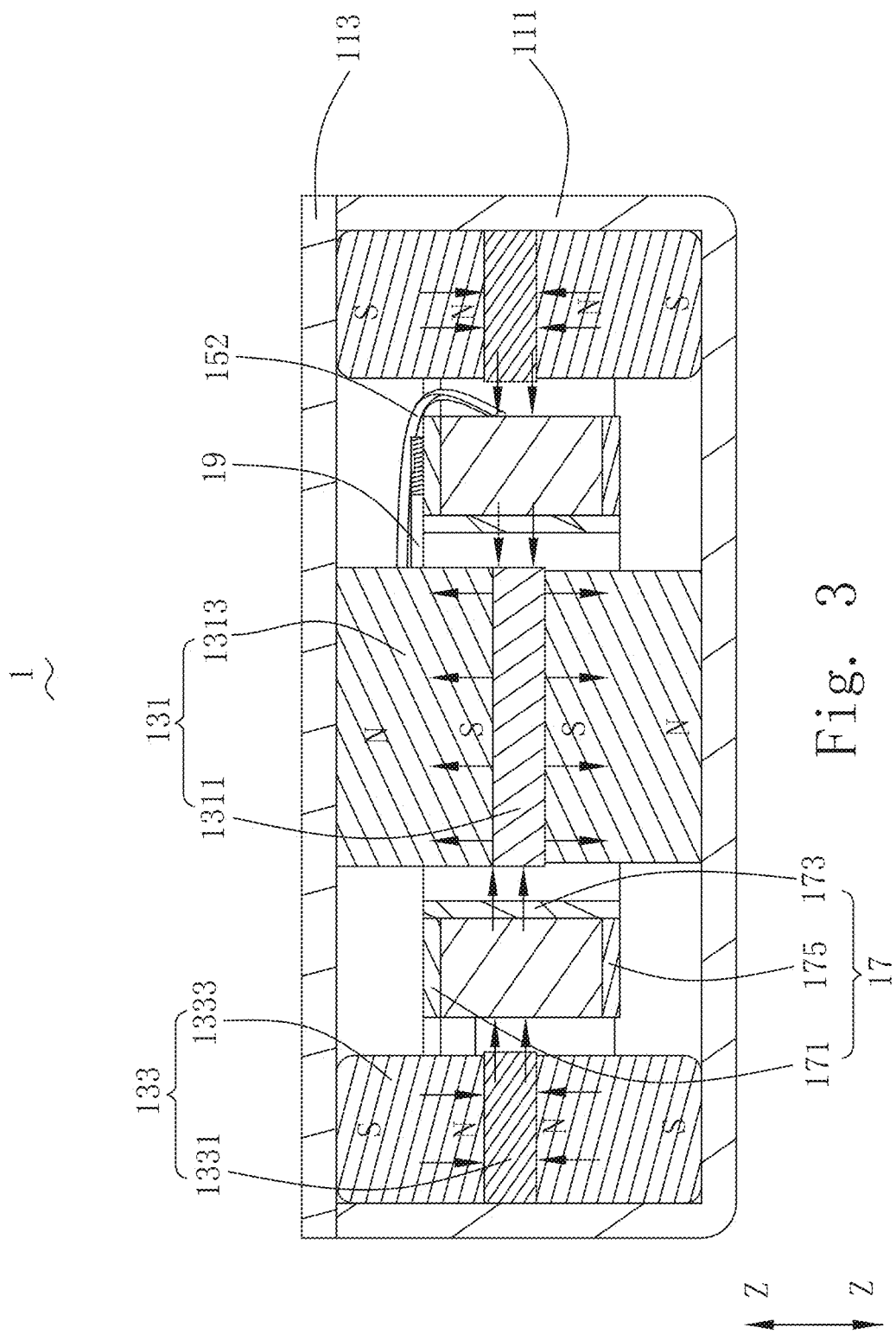
FIG. 3 is a cross-sectional view of the linear motor, taken along line A-A in FIG. 1.

Please refer to FIG. 3, the magnet assembly 13 comprises a main magnet unit 131 and auxiliary magnet units 133 provided symmetrically on both sides of the main magnet unit 131 and forming a magnetic gap. The main magnet unit 131 comprises main magnets 1313 and a main pole plate 1311 sandwiched between the main magnets 1313. The main magnets 1313 are two in number and configured with the same magnetic poles thereof opposed to each other. The auxiliary magnet unit 133 comprises auxiliary magnets 1333 provided as stacked and auxiliary pole plate 1331 provided as switched between the auxiliary magnets 1333. The auxiliary magnet units 133 are two in number, and each of the auxiliary magnet unit 133 comprises two auxiliary magnets 1331 configured with the same magnetic poles thereof opposed to each other. The main magnet unit 131 and the auxiliary magnet unit 133 are of opposite polarity. In this embodiment, the main magnet 1313 can be provided in a N-S-S-N mode, or a S-N-N-S mode. In FIG. 3, the arrow represents the direction of magnetic force line which passes through the coil 151.

Figure 4:
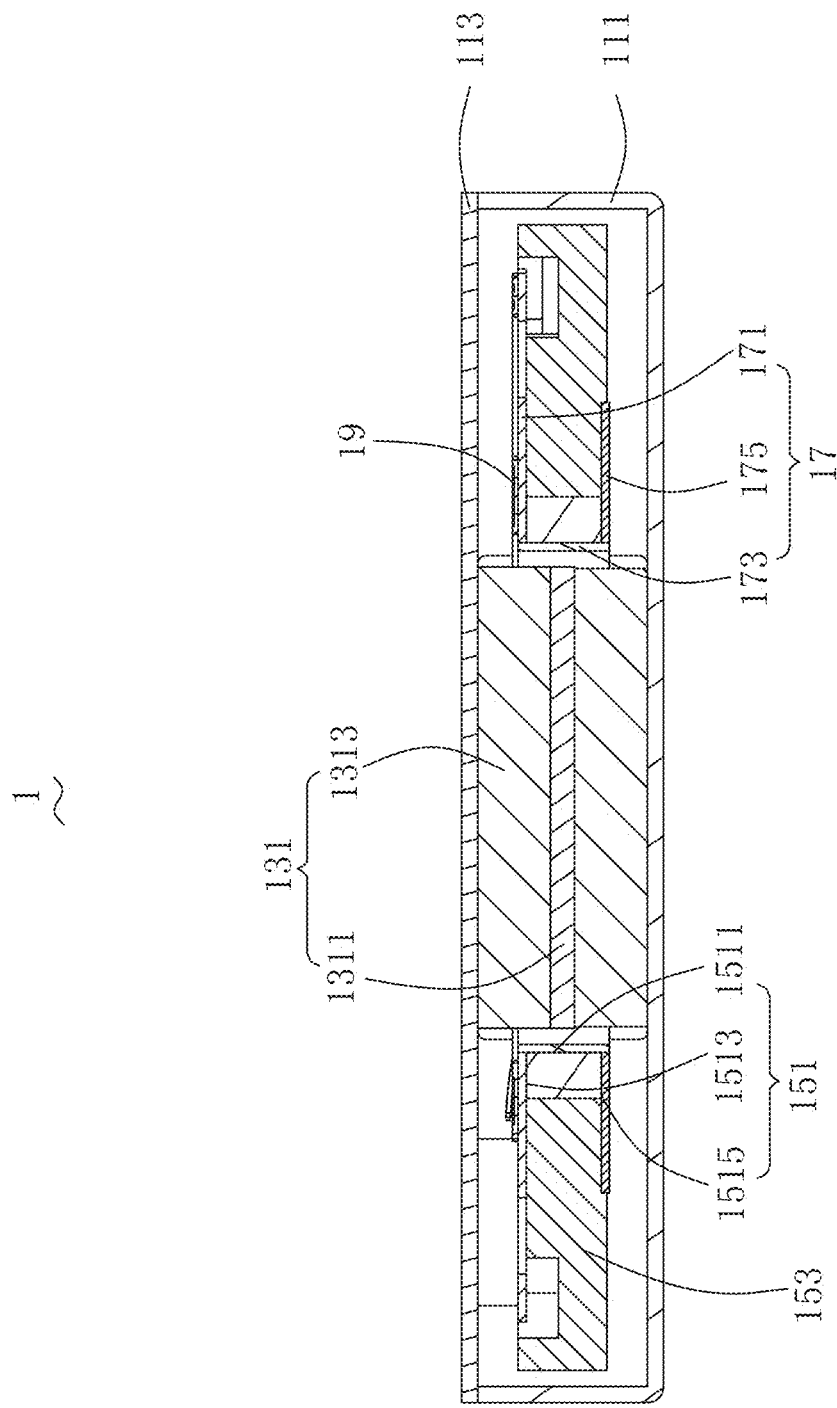
FIG. 4 is a cross-sectional view of the linear motor, taken along line B-B in FIG. 1.

Please refer to FIG. 4, the vibration member 15 comprises coil 151 inserted into the magnetic gap, a wire lead 152 electrically connecting the coil 151 and the flexible circuit board 19, and weights 153 provided symmetrically at both sides of the coil 151.

The coil 151 comprises an inner surface 1511 close to the main magnet unit 131, an upper surface 1513 close to the flexible circuit board 19 and a lower surface 1515 opposite to the upper surface 1513.

Figure 5:
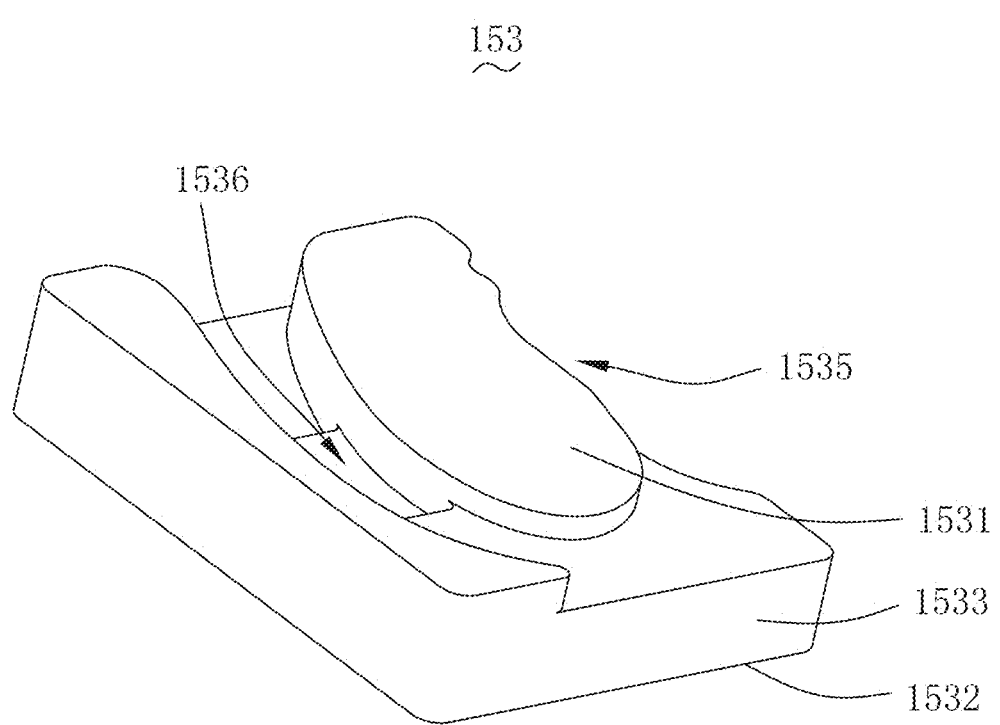
FIG. 5 is an isometric view of a weight of the linear motor in FIG. 1.
Figure 6:
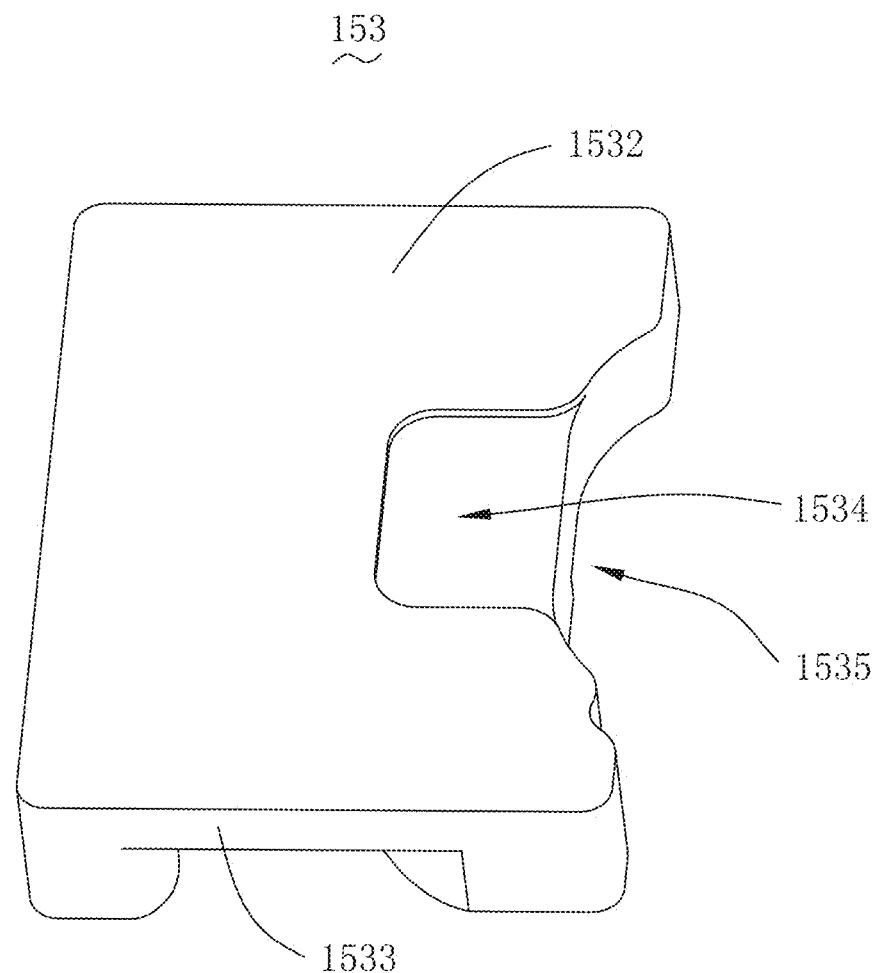
FIG. 6 is an isometric view of the weight in FIG. 5, from another aspect.

Referring to FIGS. 5-6, the weights 153 comprise a top face 1531, a bottom face 1532, a side face 1533, a first limiting slot 1535, a second limiting slot 1534 and a third limiting slot 1538. The top face 1531 is the surface where the weights 153 connects the flexible circuit board 19. The top face 1531 and the bottom face 1532 are provided oppositely. The side face 1533 connects the top face 1531 and the bottom face 1532. The second limiting slot 1534 is formed as concave from the bottom face 1532 to the top face 1531. The first limiting slot 1535 is formed as concave from the side face 1533 toward the direction far away from the coil 151, the first limiting slot 1535 gets in contact with the coil 151 and communicates with the second limiting slot 1534. The third limiting slot 1536 is formed as concave from the top face 1531 to the bottom face 1531.

The support member 17 comprises an elastic supporting member 171 supporting the vibration member 15 suspended inside the accommodation space 1A, a coil frame 173 inserted into the magnetic gap and a connecting piece 175 connecting the coil 151 and the weights 153. The coil 151 and the weights 153 are sandwiched between the connecting piece 175 and the elastic supporting member 171; the coil frame 173 is attached and connected with the inner surface 1511 of the coil 151; the coil frame 173 is provided between the coil 151 and the auxiliary magnet unit 133, the coil 151 is wound around one side surface of the coil frame 173 opposite to the main magnet unit 131.

The elastic supporting member 171 comprises an installation section 1711 connected with the vibration member 15 and deformation sections 1715 provided symmetrically on both sides of the coil 151. The deformation section 1715 has one end connected with the installation section 1711, and another end fixed to the housing 11. The installation section 1711 comprises a coil installation section 17111 matched with the coil 151 in shape, and weight installation sections 17113 extending in the direction from both ends of the coil installation section 17111 to the weights 153, the coil installation 17111 is connected with the upper surface of the coil 151, the weight installation sections 17113 are connected with the top face 1531. The third limiting slot 1536 is corresponding to the deformation section 1715, the deformation section 1715 is suspended inside the third limiting slot 1536. One end of the deformation section 1715 is clamped and fixed to the installation slot 1115. In this embodiment, the installation slot 1115 is a through-hole, the flexible circuit board 19 is provided through the installation slot 1115 and extends to outside of the housing 111 through the installation slot 1115.

The coil frame 173 is attached with the inner surface 1511 of the coil 151. The coil frame 173 comprises a lead hole 1731 provided on it and used for outgoing of the wire lead 152, the lead hole 1731 is formed as concave from one end of the coil frame 173 close to the flexible circuit board 19 toward the other end far away from the flexible circuit board 19. In this embodiment, the lead hole is one in number and provided beside the short axis of the coil frame 173. The lead hole can be more than one in number and can be opened at other position of the coil frame 173.

The connecting piece 175 comprises a coil connecting section 1751 matched with the coil 151 in shape, and weight connecting sections 1753 extending in the direction from the coil connecting piece 1751 to the weights 153. The connecting section 1751 is connected with the lower surface 1515 of the coil 151, the weight connecting sections 1753 is connected with the weights 153. The second limiting slot 1534 is matched with the weight connecting sections 1753 in shape and accommodates the weight connecting sections 1753. The coil connecting section 1751 encircles into a ring shape as a through-hole, the main magnet unit 131 is provided through the coil connecting section 1751.

The flexible circuit board 19 is attached to the elastic supporting member 171 and matched with it in shape. The flexible circuit board 19 comprises internal solder pads 191 provided on both sides of the coil 151, an external solder pad 193 provided outside the housing 11 and a conductive path 195 connecting the internal solder pads 191 and the external solder pad 193. The internal solder pads 191 are provided respectively on both sides of the coil 151 and provided as attached to the weight installation sections 17113. The internal solder pads 191 are electrically connected with the coil 151, the external solder pad 193 is electrically connected with external circuit, the coil 151 transmits electrical signal with external circuit through the internal solder pads 191, the conductive path 195 and the external solder pad 193.

When the linear motor 1 is working, electrify the coil 151 through the flexible circuit board 19 to generate magnetic field which changes with time as the result of current direction, thus causing changes in the stress direction of the coil 151 under the force of the main magnet unit 131 and the auxiliary magnet unit, so as to drive vibration of the coil 151 along the direction parallel to Z-Z axis. The elastic supporting member 171 and the connecting piece 175 vibrate together along the direction parallel to Z-Z axis as driven by the coil 151, the weights 153 vibrates along the direction parallel to Z-Z axis as driven by the elastic supporting member 171 and the connecting piece 175. The direction of the Z-Z axis is the direction from the main magnet 1313 to the main pole plate 1311.

The Second Exemplary Embodiment

Figure 7:
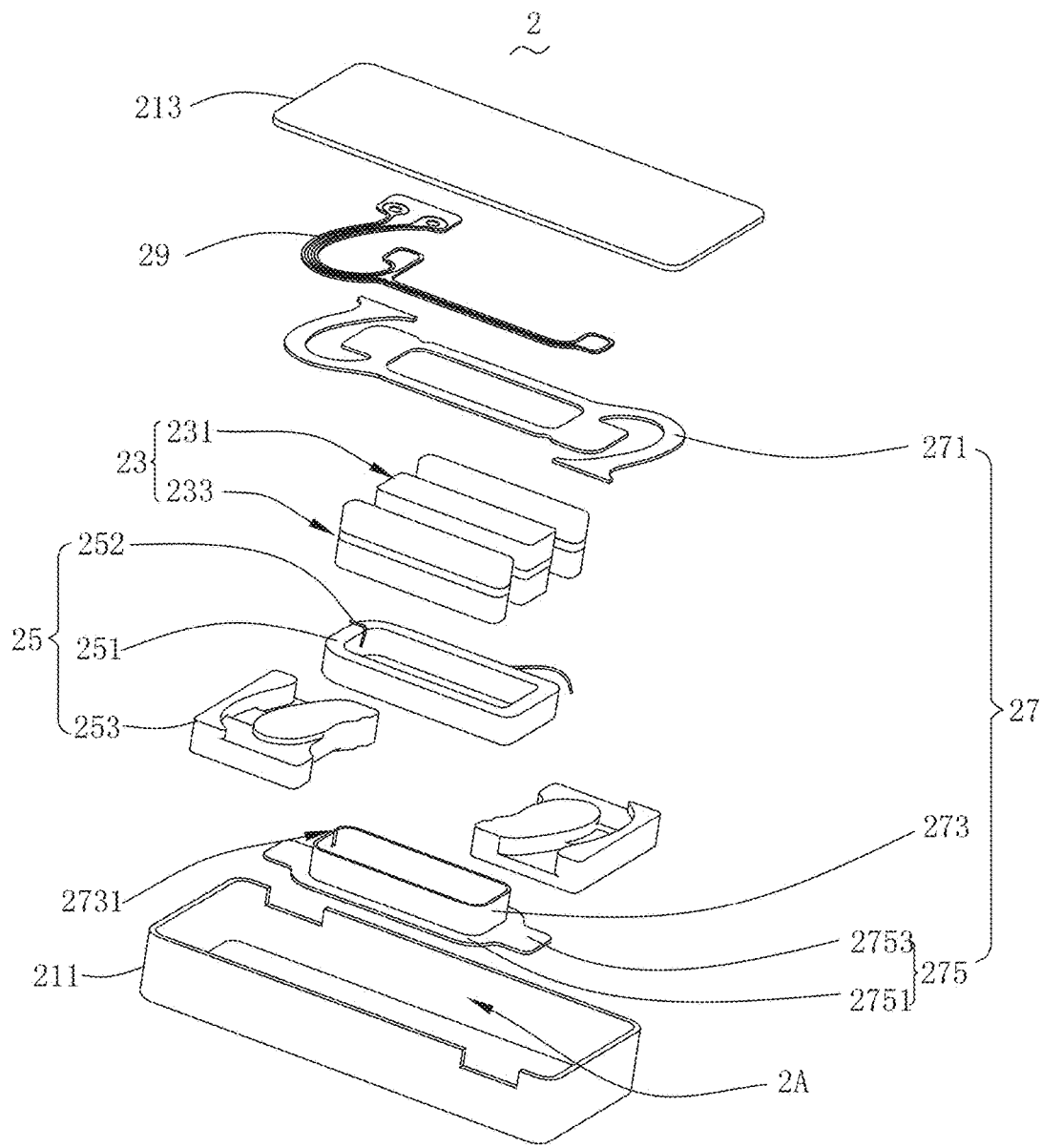
FIG. 7 is an exploded view of a linear motor in accordance with a second exemplary embodiment of the present disclosure.

Please refer to FIG. 7, the linear motor 2 comprises a housing with an accommodation space 2A, a magnet assembly 23 and vibration member 25 accommodated in the accommodation space 2A, a support member 27 for supporting the vibration member 25 suspended in the accommodation space 2A, and a flexible circuit board 29 attached to the support member 27 and far away from the surface of the vibration member 25, the magnet assembly 23 is fixed inside the housing.

The shapes, structures, relative positions of the housing, the magnet assembly 23, the vibration member 25 and the flexible circuit board 29 are as same as those of the linear motor 1 in the first embodiment.

The housing comprises a housing body 211 and a cover plate 213 cover-connected to the housing body 211.

The magnet assembly 23 comprises a main magnet unit 231 and an auxiliary magnet unit 233 provided symmetrically on both sides of the main magnet unit 231 and cooperatively forming a magnetic gap.

The vibration member 25 comprises a coil 251 inserted into the magnetic gap, a wire lead 252 electrically connecting the coil 251 and the flexible circuit board 29, and weights 253 provided symmetrically at both sides of the coil 251.

The support member 27 comprises an elastic supporting member 271 supporting the vibration member 25 suspended inside the accommodation space 2A, a coil frame 273 inserted into the magnetic gap and a connecting piece 275 connecting the coil 251 and the weights 253. The weights 253 and the coil 251 are sandwiched between the elastic supporting member 271 and the connecting piece 275. The coil frame 273 is provided as attached with the surface of the coil 251 close to the main magnet unit 131. The surface of the coil frame 273 far away from the flexible circuit board 29 is connected with the support piece 275, and the coil frame 273 is formed integrally with the support piece 275.

The connecting piece 275 comprises a coil connecting section 2751 matched with the coil 251 in shape, and weight connecting sections 2753 extending in the direction from the coil connecting section 2751 to the weights 253, the coil connecting section 2751 is connected with the coil 251, the weight connecting sections 1753 is connected with the weights 153. The coil connecting section 1751 encircles into a ring shape as a through-hole, the main magnet unit 131 is provided through the coil connecting section 1751. The coil frame 273 is connected with the coil connecting section 2751.

The distinction between the second embodiment and the first embodiment is that, the connecting piece 175 in the first embodiment is separated with the coil frame 173, the connecting 275 in the second embodiment is connected with the coil frame 273 and both together form an integral structure, with other structural features as same as those in the first embodiment, which is needless to describe here.

The Third Exemplary Embodiment

Figure 8:
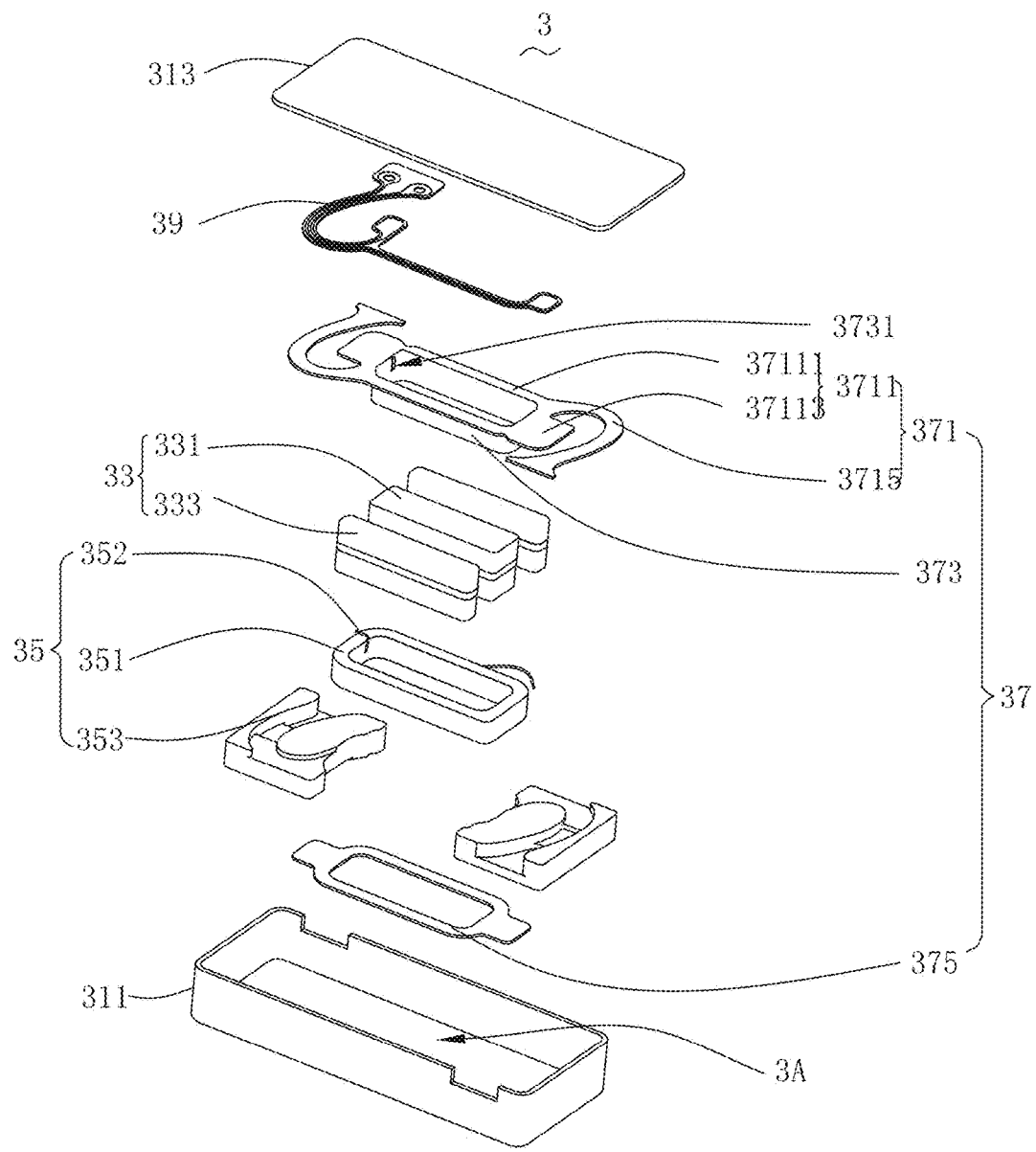
FIG. 8 is an exploded view of a linear motor in accordance with a third exemplary embodiment of the present disclosure.

Please refer to FIG. 8, the linear motor 3 comprises a housing with an accommodation space 3A, a magnet assembly 33 and a vibration member 35 accommodated in the accommodation space 3A, a support member 37 for supporting the vibration member 35 suspended in the accommodation space 3A, and a flexible circuit board 39 attached to the support member 37 and far away from the surface of the vibration member 35. The magnet assembly 33 is fixed inside the housing.

The shapes, structures, relative positions of the housing, the magnet assembly 33, the vibration member 35 and the flexible circuit board 39 are as same as those of linear motor 1 in the first embodiment.

The housing comprises a housing body 311 and a cover plate 311 cover-connected to the housing body 313.

The magnet assembly 33 comprises the main magnet unit 331 and the auxiliary magnet component 333 provided symmetrically on both sides of the main magnet unit 331 and forming a magnetic gap.

The vibration member 35 comprises a coil 351 inserted into the magnetic gap, a wire lead 352 electrically connecting the coil 351 and the flexible circuit board 39, and weights 353 provided symmetrically at both sides of the coil 351.

The support member 37 comprises an elastic supporting member 371 supporting the vibration member 35 suspended inside the accommodation space 3A, a coil frame 373 inserted into the magnetic gap and a connecting piece 375 connecting the coil 351 and the weights 353. The weights 353 and the coil 351 are provided as switched between the elastic supporting member 371 and the connecting piece 375. The coil frame 373 is provided as attached with the surface of the coil 351 close to the main magnet unit 331. The surface of the elastic supporting member 371 far away from the flexible circuit board 39 is connected with the coil frame 375, and the coil frame 373 is formed integrally with the support piece 371.

The elastic supporting member 371 have central symmetry and elastic deformation, it comprises an installation section 3711 connected with the vibration member 35 and a deformation section 3715 provided symmetrically on both sides of the coil 351, the distortion section 3715 has one end connected with the installation section 3711, the other end fixed to the housing. The installation section 3711 comprises a coil installation section 37111 matched with the coil 351 in shape, and two weight installation sections 37113 extending in the direction from both ends of the coil installation section 37111 to the weights 353, the coil installation section 37111 is connected with the coil 351, the weight installation sections 37113 are connected with the weights 353. The coil frame 373 is connected with the coil installation section 37111.

The coil frame 373 comprises a lead hole 3731 provided on it and used for outgoing of the wire lead 352, the lead hole 3731 is formed as concave from one end of the coil frame 373 close to the flexible circuit board 39 to the other end far away from the flexible circuit board 39. In this embodiment, the lead hole 3731 is one in number and provided beside the short axis of the coil frame 3571.

The distinction between the third embodiment and the first embodiment is that, the elastic supporting member 171 in the first embodiment is separated with the coil frame 173, the elastic supporting member 371 in the third embodiment is connected with the coil frame 373 and both together form an integral structure, with other structural features as same as those in the first embodiment, which is needless to describe here.

The Fourth Exemplary Embodiment

Figure 9:
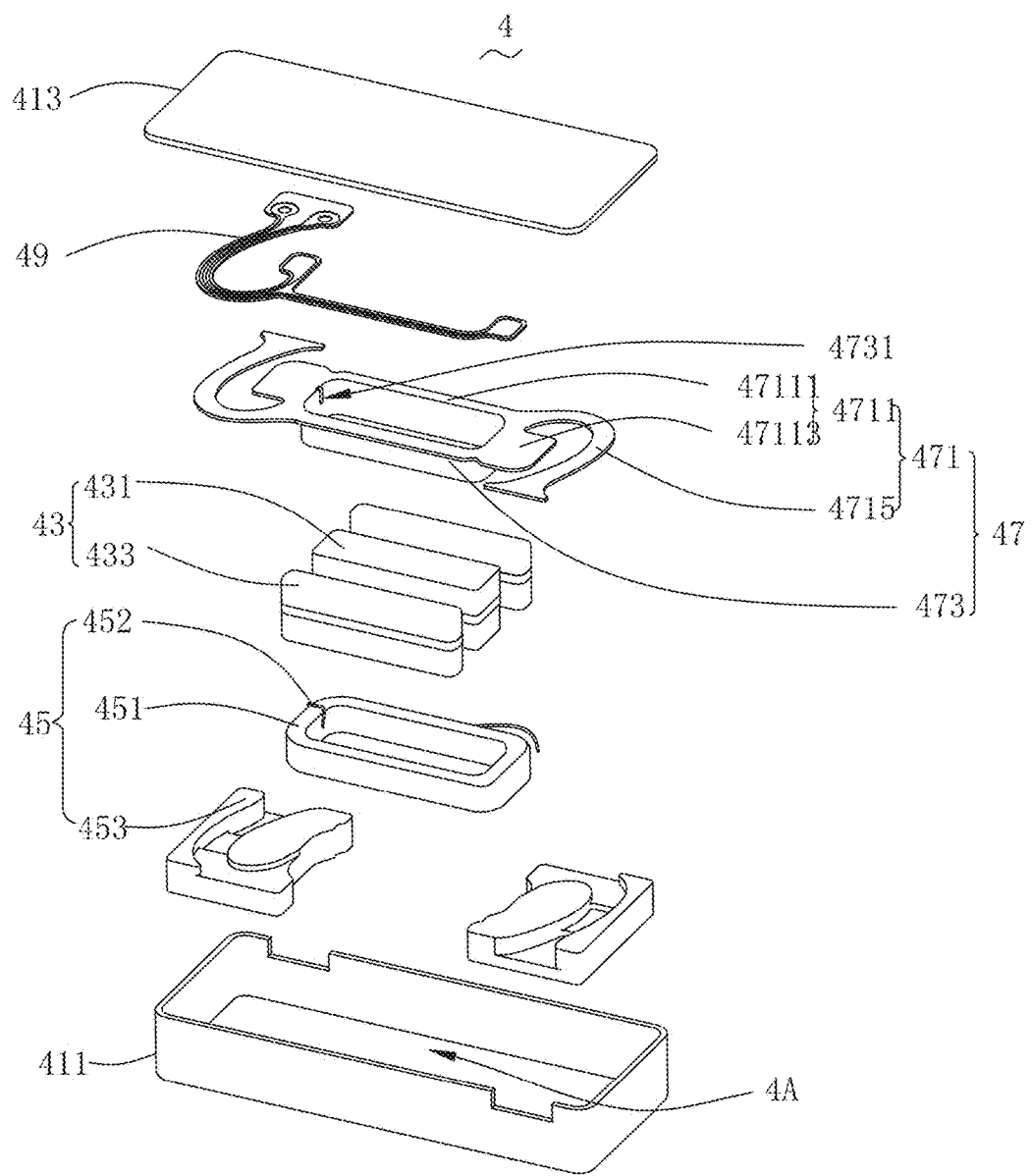
FIG. 9 is an exploded view of a linear motor in accordance with a fourth exemplary embodiment of the present disclosure.

Please refer to FIG. 9, the linear motor 4 comprises a housing (not shown in the figure) with accommodation space 4A, a magnet assembly 43 and vibration member 45 accommodated in the accommodation space 4A, a support member 47 for supporting the vibration member 45 suspended in the accommodation space 4A, and a flexible circuit board 49 attached to the support member 47 and far away from the surface of the vibration member 45, the magnet assembly 43 is fixed inside the housing.

The shapes, structures, relative positions of the housing, the magnet assembly 43, the vibration member 45 and the flexible circuit board 49 are as same as those of linear motor 1 in the embodiment 1.

The housing comprises a housing body 411 and a cover plate 413 cover-connected to the housing body 411.

The magnet assembly 43 comprises a main magnet unit 431 and auxiliary magnet units 433 provided symmetrically on both sides of the main magnet unit 431 and forming a magnetic gap.

The vibration member 45 comprises coil 451 inserted into the magnetic gap, a wire lead 451 electrically connecting the coil 452 and the flexible circuit board 49, and weights 453 provided symmetrically at both sides of the coil 451.

The support member 47 comprises an elastic supporting member 471 supporting the vibration member 45 suspended inside the accommodation space 4A and a coil frame 473 inserted into the magnetic gap. The coil frame 473 is provided as attached with the surface of the coil 451 close to the main magnet unit 431. The surface of the elastic supporting member 471 far away from the flexible circuit board 49 is connected with the coil frame 475, and the coil frame 473 is formed integrally with the support piece 471.

The elastic supporting member 471 have central symmetry and elastic deformation, it comprises an installation section 4711 connected with the vibration member 45 and deformation sections 4715 provided symmetrically on both sides of the coil 451, the deformation section 4715 has one end connected with the installation section 4711, the other end fixed to the housing. The installation section 4711 comprises a coil installation section 47111 matched with the coil 451 in shape, and two weight installation sections 47113 extending in the direction from both ends of the coil installation section 47111 to the weights 453, the coil installation sections 47111 are connected with the coil 451, the weight installation sections 47113 are connected with the weights 453. The coil frame 473 is connected with the coil installation section 47111.

The coil frame 473 comprises a lead hole 4731 provided on it and used for outgoing of the wire lead 452, the lead hole 4731 is formed as concave from one end of the coil frame 473 close to the flexible circuit board 49 to the other end far away from the flexible circuit board 49. In this embodiment, the lead hole 4731 is one in number and provided beside the short axis of the coil frame 473.

The distinction between the fourth embodiment and the first embodiment is that, the linear motor 1 in the first embodiment is provided with the connecting piece 175, and the elastic supporting member 171 is separated with the coil frame 173; the linear motor 4 in the fourth embodiment is not provided with connecting piece, and the elastic supporting member 471 is connected with the coil frame 473 and take a integral look, with other structural features as same as those in the first embodiment, which is needless to describe here.

The present invention discloses a new type of linear, by providing the attachment of the coil frame with the coil, supporting the coil shape with the coil frame, the coil is made insusceptible to deformation with rigidity increased simultaneously, thus improving the reliability of the linear motor.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A linear motor comprising:
   a housing with an accommodation space;
   a magnet assembly accommodated in the accommodation space, the magnet assembly including a main magnet unit and two auxiliary magnet units located on both sides of the main magnet unit for forming a magnetic gap;
   a vibration member accommodated in the accommodation space, the vibration member including a coil inserted into the magnetic gap and weights located at both sides of the coil;
   a support member suspending the vibration member in the accommodation space, the support member including an elastic supporting member supporting the vibration member and a coil frame inserted into the magnetic gap; wherein
   the coil frame is disposed between the coil and the main magnetic unit, and the coil is wound around a side surface of the coil frame opposite to the main magnet unit; and
   each weight comprises a top face connecting the elastic supporting member, a bottom face opposite to the top face, and a side face connecting the top face with the bottom face, with a first limiting slot formed as concave from the side face toward the direction away from the coil, and the coil is received in the first limiting slot; wherein,
   the vibration member further comprises a connecting piece connecting the coil and the weights, the coil and the weights are sandwiched between the connecting piece and the elastic supporting member; the connecting piece comprises a coil connecting section matched with the coil in shape and a weight connecting section extending in a direction from both ends of the coil connecting section to the weights, the coil is connected with the coil connecting section, the weight connecting section is connected with the weights; and each weight comprises a second limiting slot formed as concave from the bottom face to the top face and communicating with the first limiting slot, the second limiting slot is matched with the connecting piece in shape and accommodates the weight connecting section.

2. The linear motor as described in claim 1, wherein the coil frame is formed integrally with the connecting piece.

3. The linear motor as described in claim 1 further comprising a flexible circuit board attached to the elastic supporting member, the vibration member comprises a wire lead electrically connecting the coil and the flexible circuit board, the coil frame comprises a lead hole for outgoing of the wire lead.

4. The linear motor as described in claim 1, wherein the elastic supporting member comprises an installation section connecting with the vibration member and a deformation section provided symmetrically at both sides of the coil, the deformation section has one end connected with the installation section and another end fixed at the housing, each weight comprises a third limiting slot concave from the top face to the bottom face, the third limiting slot is opposite to the second limiting slot and corresponding with the deformation section which is suspended at the third limiting slot.

5. The linear motor as described in claim 4, wherein the installation section comprises a coil installation section matched and connected with the coil, the coil frame is connected with the coil installation section, the coil frame is formed integrally with the elastic supporting member.

6. The linear motor as described in claim 4, wherein the main magnet unit comprises main magnets and a main pole plate sandwiched between the main magnets, the auxiliary magnet unit comprises auxiliary magnets and an auxiliary pole plate sandwiched between the auxiliary magnets, the main magnets are two in number and configured with the same magnetic poles thereof opposed to each other, the auxiliary magnet unit are two in number, each of the auxiliary magnet unit comprises two auxiliary magnets configured with the same magnetic poles thereof opposed to each other.

7. The linear motor as described in claim 1, wherein two opposite ends of the main magnet unit are both fixed to the housing, along a vibration direction of the vibration member.

8. The linear motor as described in claim 7, wherein the coil and the weights sheathe the main magnet unit.

9. The linear motor as described in claim 1, wherein the housing comprising a housing body and a cover plate cover-connected to the housing body, the housing body and the cover plate forming the accommodation space, the housing body comprising a bottom wall provided opposite to the cover plate, and a side wall extending in the direction from the bottom wall to the cover plate, with an installation slot penetrating the side wall, and an end of the elastic supporting member is installed inside the installation slot and further fixed and connected to the side wall.

* * * * *